United States Patent [19]

Seki

[11] Patent Number: 4,469,008

[45] Date of Patent: Sep. 4, 1984

[54] NEGATIVE PRESSURE TYPE BOOSTER ARRANGEMENT

[75] Inventor: Masayuki Seki, Nagano, Japan

[73] Assignee: Nisshin Kogyo Kabushiki Kaisha, Japan

[21] Appl. No.: 304,937

[22] Filed: Sep. 23, 1981

[30] Foreign Application Priority Data

Sep. 30, 1980 [JP] Japan ............................... 55-136458
Sep. 30, 1980 [JP] Japan ............................... 55-136459
Sep. 30, 1980 [JP] Japan ............................... 55-136460
Sep. 30, 1980 [JP] Japan ............................... 55-139474

[51] Int. Cl.³ ............................................. F15B 9/10
[52] U.S. Cl. ................................................ 91/376 R
[58] Field of Search ................. 91/383, 369 R, 369 A, 91/369 B, 376 R, 377; 251/294; 60/547.1, 553, 593

[56] References Cited

U.S. PATENT DOCUMENTS 3,841,449 10/1974 Coffey et al. ................. 91/376 R X
4,022,112 5/1977 Putt et al. ...................... 91/369 A X

FOREIGN PATENT DOCUMENTS 969999 6/1975 Canada .............................. 91/369 A Primary Examiner—Robert E. Garrett
Assistant Examiner—Abram McConnell Bradley, IV
Attorney, Agent, or Firm—Cantor and Lessler

[57] ABSTRACT

A negative pressure type booster arrangement comprises a pair of booster shells divided by a booster piston disposed therein for reciprocating movement into a constantly negative pressure chamber and a variable pressure chamber. The second chamber is always put in interchangeable communication with the first chamber via a control valve mechanism. An input rod is retractively connected to the booster piston, and is also connected to the valve control mechanism for permitting the booster piston to follow advancement of the input rod due to a difference in air pressure between both chambers. An input transmitting lever is mounted on the rear end of the input rod. A first arm is provided for supporting an operating lever extending successively from the booster shells and for pivotally supporting one end of the input transmitting lever, and a second arm is provided for supporting an operating wire.

5 Claims, 6 Drawing Figures

NEGATIVE PRESSURE TYPE BOOSTER ARRANGEMENT

BACKGROUND OF THE INVENTION

The present invention is concerned with a negative pressure type booster arrangement which is used for the operation of a brake master cylinder of a vehicle and constructed from a working mechanism, a control valve mechanism, a servo mechanism and a liquid pressure generator mechanism as an integral unit.

In the prior art negative pressure type booster arrangement of this kind, the connection of a brake pedal with an input rod is effected with clevises. A force is applied on the brake pedal to operate the control valve mechanism, so that a difference in air pressure is brought about between a constantly negative pressure chamber and a variable pressure chamber by a booster piston of the servo mechanism. That difference in air pressure then gives rise to a booster output which, in turn, supplies a higher liquid pressure from the liquid pressure generator mechansim to a brake device. Thus, the conventional booster arrangement has the advantages that a lesser force impressed on the brake pedal is converted to a larger force for braking.

The prior art booster arrangement has the following disadvantages, however. As the arrangement includes the liquid pressure generator mechanism attached bodily to the servo mechanism etc., some limitations are placed on the position at which the booster arrangement is mounted in place. The prior art arrangement cannot be used with two-wheeled vehicles such as motorcycles which are operated by a brake lever or the like in a remote control manner, because of the fact that the brake pedal is connected directly to the input rod by means of clevises. A risk is also incurred in using the arrangement, since a sufficient braking force is not obtained due to increases in the lost strokes of the brake pedal. Besides, it is troublesome to adjust the braking force. Furthermore, there is a possibility that, when a push is given to the brake pedal to cause movement of the input rod and hence actuation of the control valve mechanism, the input rod may swing and clog an associated air inlet passage, rendering the servo mechanism inoperative.

On the other hand, the prior art booster arrangement includes a dust boot disposed between a cylinder member extending rearwardly from the booster shell and the input rod for the purpose of preventing foreign matter such as sand and dust from entering the control valve mechanism of said extension member. However, such a dust boot should permit an amount of air to be introduced into the working chamber via the control valve mechanism or into said extension member so as to compensate a change in the volume thereof, which may take place during the forward or backward movement of the input rod. To this end, various attempts have been or are being made; however, none of them offer any satisfactory results. There is still a strong demand for a simplified arrangement for the prevention of entrance of sand, dust, water and the like. The present invention provides a solution to these problems.

SUMMARY OF THE INVENTION

An object of the present invention is to make possible a link type remote control operation effected by a brake pedal or lever, whereby the position at which it is fixed in place is selected, as the case may be. According to the present invention, this can be achieved by provision of a negative pressure type booster arrangement comprising a pair of booster shells divided by a booster piston disposed therein for reciprocating movement into a constantly negative pressure chamber terminating in a negative pressure source and a variable pressure chamber which is always put in interchangeable communication with said negative pressure chamber or the air via a control valve mechanism, an input rod which is retractively connected to said booster piston, and is also connected to said control valve mechansim for permitting said booster piston to follow advancement of said input rod due to a difference in air pressure between both said chambers, an input transmitting lever disposed on the rear end of said input rod, a first arm for supporting an operating lever extending successively from said booster shells and for pivotally supporting one end of said input transmitting lever, and a second arm for supporting an operating wire, which is positioned opposite to said first arm, so that an operating force is applied on the other end of said operating lever by means of said operating wire, said control valve mechanism is actuated through said input rod, and a booster output is produced by said difference in air pressure between said both chambers.

Another object of the present invention is to maintain the given servo diameter of the booster arrangement, while increasing the servo output. According to the present invention, this can be achieved by provision of a negative pressure type booster arrangement in which the point of application of the input transmitting lever of the input rod is positioned between the supporting points of the first and second arms.

A further object of the present invention is to reduce lost strokes attendant upon the interchange of the first valve seat and the second valve seat. According to the present invention, this can be achieved by provision of a negative pressure type booster arrangement which further includes an input transmitting lever disposed on the rear end of said input rod, a first arm for supporting an operating lever extending successively from said booster shells and for pivotally supporting one end of said input transmitting lever and a second arm for supporting an operating wire, the other end of said operating lever being supplied with an operating force by means of said operating wire, and said control valve mechanism being actuated through said input rod, an adjusting bolt mounted on a case for said operating wire and inserted into a supporting portion of said second arm, and a nut threaded onto said bolt, so that a distance is adjusted between the points of force of said first and second arms, and said input rod is moved forwards or backwards to adjust a clearance between the valve head of a control valve and a second valve seat of said control valve mechanism, as the case may be.

A still further object of the present invention is to prevent the valve head of a poppet valve from being spaced away from the first valve seat by the rocking movement of the input rod, which may take place at the time when the input rod is moved forwards or backwards by the braking operation. According to the present invention, this can be achieved by provision of a negative pressure type booster arrangement in which said input rod has an end formed into a spherical shape so as to abut slidingly and rockingly the inner wall of a hole through which said booster piston is inserted, and a first annular valve seat body is provided, having a sliding portion to come in sliding contact with said spherical end and a first valve seat capable of abutting the valve head of a control valve of said control valve mechanism, so that the rocking movement of said input rod has no adverse influence on said first valve seat which the control valve abuts.

A still further object of the present invention is to prevent foreign matter such as sand, dust or water from entering the booster arrangement. According to the present invention, this can be achieved by provision of a negative pressure type booster arrangement which further includes a cylindrical member extending from the rear booster shell, a dust boot attached to said cylindrical member, an annular passage formed therebetween, a communication slot formed in the upper portion of said member for making communication between said annular passage and the inner periphery of said member, and an air inlet formed in said dust boot and put in communication with said annular passage, said dust boot being attached to said cylindrical member in such a manner that said air inlet port is located in a lower position.

BRIEF DESCRIPTION OF THE DRAWINGS

The aforesaid and other objects of the present invention will become apparent from the following explanation given with reference to the accompanying drawings, in which:

FIG. 1 is a sectional front view taken along the line I—I of FIG. 2, FIG. 2 is a right side view of the arrangement according to the present invention.

FIG. 3 is a sectional front view showing the arrangement in which the communication slot and the air inlet port are positioned diametrically with respect to the annular passage, and the dust boot is further provided with a projecting tube communicating with the air inlet port, FIG. 4 is a sectional front view showing the arrangement in which the cylindrical member is provided with a stepped engaging groove to form an annular groove, and the annular passage is formed by the engaging opening edge of the dust boot and the annular groove, FIG. 5 is a sectional front view showing a filter received in the projecting tube of FIG. 3, and FIG. 6 is a sectional front view showing the arrangement in which the engaging groove is formed in its rear portion with an annular groove, and the annular passage is formed between the drum portion of the dust boot and the annular groove.

DETAILED DESCRIPTION OF THE INVENTION

Figure 1:
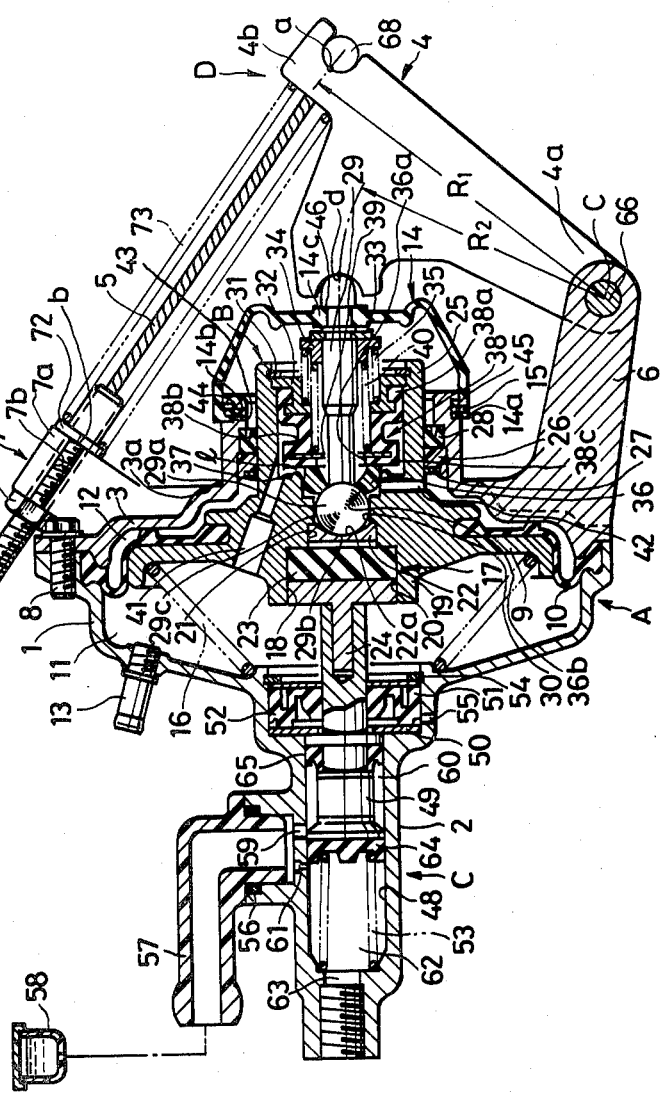
FIGS. 1 and 2 show the negative pressure type booster arrangement comprising integrally a servo mechanism, a control valve mechanism, a liquid pressure generator mechanism and a working mechanism.

One embodiment of the present invention will now be explained with reference to FIGS. 1 and 2.

The present arrangement comprises integrally a servo mechanism A, a control valve mechanism B, a liquid pressure generator mechanism C and a working mechanism D.

Referring first to the servo mechanism A, a front booster shell 1 is bodily provided at its front portion with a master cylinder 2 with the built-in liquid pressure generator mechanism C to be described later. A rear booster shell 3 is bodily provided at its rear portion with support arms 6 and 7 for carrying an operating lever 4 and an operating wire 5 associated with the working mechanism D to be described later. Both shells 1 and 3 are then secured to each other by means of a suitable number of clamp bolts 8 to form a housing, the interior of which is divided into a constantly negative pressure chamber 11 and a variable pressure chamber 12 by a booster piston 9 and a diaphragm 10 which is in engagement with the back thereof. The negative pressure chamber 11 is always in communication with the interior of a suction manifold (not shown), serving as a negative pressure source, in an internal combustion engine via a hose connector 13 with a built-in check valve (not shown), whereas the variable pressure chamber 12 is designed to be always in interchangeable communication with the negative pressure chamber 11 or an air inlet 15 which is open in a dust boot 14 mounted on a rearwardly extended cylinder 3a of the shell 3 by the control valve mechanism B. The booster piston 9 is always urged in its retraction direction by a booster spring 16 disposed biasedly in the negative pressure chamber 11. The booster piston 9 is also formed on the front face of its central portion with a boss 19 having therein a stepped slot 18 for receiving a reaction mechansim 17. The slot 18 includes a front section 20 of a larger diameter and a section 21 extending rearwardly therefrom and having a smaller diameter. The sections 21 and 20 are slidingly engaged with a reaction plate 22 and a reaction rubber 23, respectively, so that an output rod 24 formed on the front face of said rubber 23 detects a reaction that it receives during braking, and transmits said reaction to the operator.

Turning now to the control valve mechanism B, a valve cylinder 25 extends rearwardly from the central portion of the booster piston 9, and is slidingly carried by a bush 26 formed on the aforesaid extended cylinder 3a. A rod stopper 27 is mounted on the front portion of the bush 26, and a piston seal 28 mounted on the rear portion thereof.

Having a spherical point 29a, an input rod 29 is inserted into the valve cylinder 25 with the point 29a abutting at its foremost spot 29b upon an annular slot 22a formed in the rear face of the reaction plate 22. The point 29a is then slidingly engaged on its side 29c with the inner periphery of a support slot 30 to hold slidingly and rockingly the input rod 29 in said slot 30. The input rod 29 is always urged in its retraction direction by a return spring 35 biasedly interposed between a valve stopper 32 fixed to the inner peripheral wall of the valve cylinder 25 by means of a snap ring 31 and a spring sheet 34 mounted on the shaft portion of the input rod 29 in such a manner that it is restricted against rearward movement by an E ring 33.

Formed of rubber or synthetic resin material having relatively high hardness, a first annular valve seat body 36 is provided on its rear annular edge with a first valve seat 36a and on its front annular edge with a sliding portion 36b which, in normal state, comes in close contact with the spherical plane of the point 29a of the input rod 29. A second valve seat 37 is formed on the inner wall of the valve cylinder 25 in such a manner that it surrounds the first valve seat 36a. A control valve 38 is provided, having one end 38a clamped to the valve cylinder 25 by means of the valve stopper 31. Formed of an elastomer such as rubber, this control valve includes an intermediate portion 38b extending radially and inwardly from the end 38a and having a thinner thickness. A valve head 38c having a larger thickness is joined to the inner end of the intermediate portion 38b confronting both valve seats 36a and 37, and is embedded therein with a reinforcing plate 39 upon which a valve spring 40 is caused to act so as to bias the head 38c toward both seats 36a and 37. In normal state, the valve head 38c comes in close contact with the first valve seat 36a, and is spaced away from the second valve seat 37 by a clearance l, as illustrated. The outer periphery of the second valve seat 37 is always caused to communicate with the negative pressure chamber 11 via a passage 41 in a power piston 9, and the intermediate portions of the first and second valve seats 36a and 37 are always caused to communicate with the variable pressure chamber 12 via another passage 42.

An annular engaging groove 43 is formed in the outer periphery of the extended cylinder 3a, and a communication slot 44 is provided in such a manner that it passes through the inner periphery of the extended cylinder 3a at a position above the groove 43. A dust boot 14 is provided in the inner periphery of its one opening edge with an annular groove 14b. This opening edge is formed therein with an air inlet 15, and is fitted into the engaging groove 43 on condition that the inlet 15 is positioned virtually diametrically with respect to the communication passage 44, whereby an annular passage 45 is formed. The dust boot is then inserted at its other opening edge into an annular engaging groove 46. Thus, the inside of the first valve seat body 36 is always in communication with the air inlet 15 via the passage 45, the slot 44 and the interior of the valve 38.

FIGS. 3 to 6 show another embodiments of the communication slot 44, the annular passage 45 and the air inlet 15 which are mounted in positions where the dust boot 14 is attached to the extended cylinder 3a of the rear booster shell 3.

Figure 3:
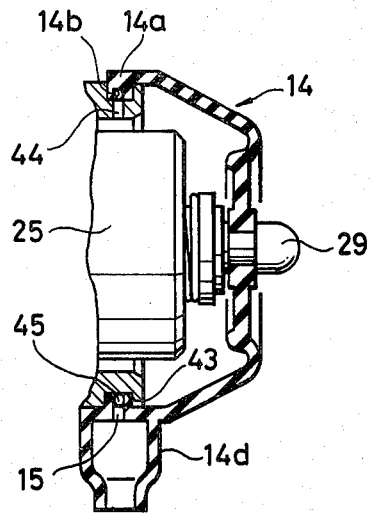
FIGS. 3 to 6 show other arrangements of a communication slot, an annular passage and an air inlet port to be formed in the positions where a dust boot is attached to a cylindrical member extending from the rear booster shell.

Referring to FIG. 3, one opening edge 14a of the dust boot 14 is provided in its inner periphery with the annular groove 14b and on its outer periphery with a projecting tube 14d having an opening end. The inlet 15 is caused to communicate with the annular groove 14b.

The annular passage 45 is then defined by the opening edge 14a and the engaging groove 43 in such a manner that the air inlet 15 is located in a lower position. This annular passage 45 is likewise positioned diametrically with respect to the air inlet 15 and the communication slot 44. In this connection, it will be understood that the projecting tube 14d may be connected to an air cleaner via a hose (not shown).

Figure 4:
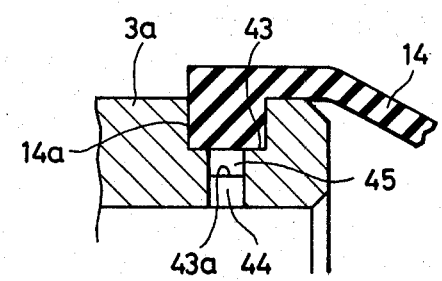

In the embodiment illustrated in FIG. 4, the annular engaging groove 43 formed in the rearwardly extended cylinder 3a is provided with a step with which the opening edge 14a of the dust boot 14 is engaged to define the annular passage 45 by the opening edge 14a and the stepped annular groove 43a. The annular groove to be formed in the engaging opening edge 14a of the dust boot 14 is then dispensed with.

Figure 5:
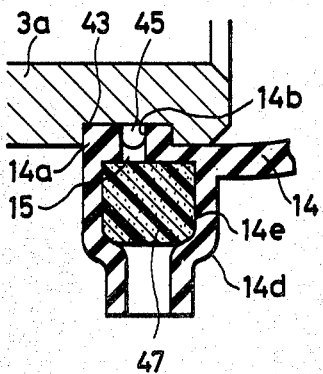

By using the interior of the projecting tube 14d as a filter receiving means 14e in the embodiment of FIG. 3, the arrangement of FIG. 5 is realised, in which a filter 47 is inserted into said means 14e from its opening end.

Figure 6:
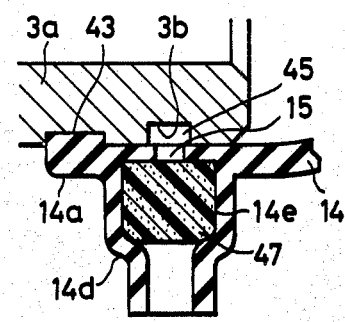

According to the arrangement of FIG. 6, the engaging groove 43 formed on the outer periphery of the extended cylinder 3a is provided in its rear portion with an annular groove 3b. In this arrangement, the annular passage 45 is formed between the drum portion of the boot 14 and the annular groove 3b by fitting the engaging opening edge 14a of the boot 14 into the engaging groove 43.

Reference will now be made to the liquid pressure generator mechanism C to be housed in the master cylinder 2. A working piston 49 is slidingly inserted into an associated cylinder 48, and is always engaged at its rear end with the output rod 24 in the negative pressure chamber 11, extending through a sealing member comprising a rod seal 52 interposed between plates 50 and 51 which are disposed between the negative pressure chamber 11 and the cylinder 48. The piston 49 is then held at its rear end against the fixed end of the output rod 24 by a return spring 53 biasedly disposed in the cylinder 48. A snap ring 54 and an air communication slot 55 are also provided. The master cylinder body 2 is provided with a hose connector 57 through an O-ring 56, which is in communication with a liquid chamber 60 via a reservoir 58 and a supply port 59 and with a liquid pressure chamber 62 via a relief port 61, respectively. With advancement of the working piston 49, a liquid pressure is supplied through a discharge port 63 into a wheel cylinder. Cup seals are shown at 64 and 65.

It is noted that the master cylinder body 2 may be formed apart from the front shell 1, and may thereafter be attached integrally thereto.

Referring to the working mechanism D, the arms 6 and 7 for supporting the operating lever and wire extend integrally from the rear portion of the rear booster shell 3, and are opposed to each other through the input rod 29. An input transmitting lever 4 has one end 4a supported pivotably on the arm 6 by a pivot pin 66. A stopper 67 is provided for the pivot pin 66.

The operating wire 5 has one end, acting as a point a of force, secured to the end 4b of the operating lever 4 by means of a fitting 68 and the other end connected to a brake lever 70 mounted on a handle bar 69 of a motorcycle. The operating wire 5 is then inserted into a support portion 7a of the arm 7 from a notch 7b formed therein. Subsequently, an adjusting bolt 71a is inserted from one end of a wire case 71 into said support portion 7a. Further, a spring 73 is biasedly interposed between the end 4b of the lever 4 and a nut 72 threaded onto the adjusting bolt 71a. A distance between a supporting point b of the support portion 7a and the points a of force of the lever 4 can thus be regulated by the bolt 71a and the nut 72 or 74 threaded onto it. The input rod 29 abuts at its rear end upon a point d of application defined between the pivotal point c and the point a of the lever 4, so that retraction of the input rod 29 is limited by the lever 4. Accordingly, the position of the lever 4 is adjusted by regulation of the nut 72 or 74. If the input rod 29 is advanced or retracted to adjust the clearance l between the valve head 38c of the control valve 38 and the second valve seat 37, then the adjusting bolt 71a can be locked to the support portion 7a by using either one of the nut 74 or 72 as a locking nut.

In the arrangement according to the present invention, the distance $R_1$ between the supporting point c and the point a of force is larger than the distance $R_2$ between the supporting point c and the point d of application, since the point d of application is positioned between the supporting points c and b of the arms 6 and 7. Consequently, it is possible to apply a less force to the input rod 29, since the force is increased by leverage. This results in increases in the servo output with no need of varying the size of the booster arrangement.

In operation, the operating wire may be replaced by a brake pedal.

Figure 2:
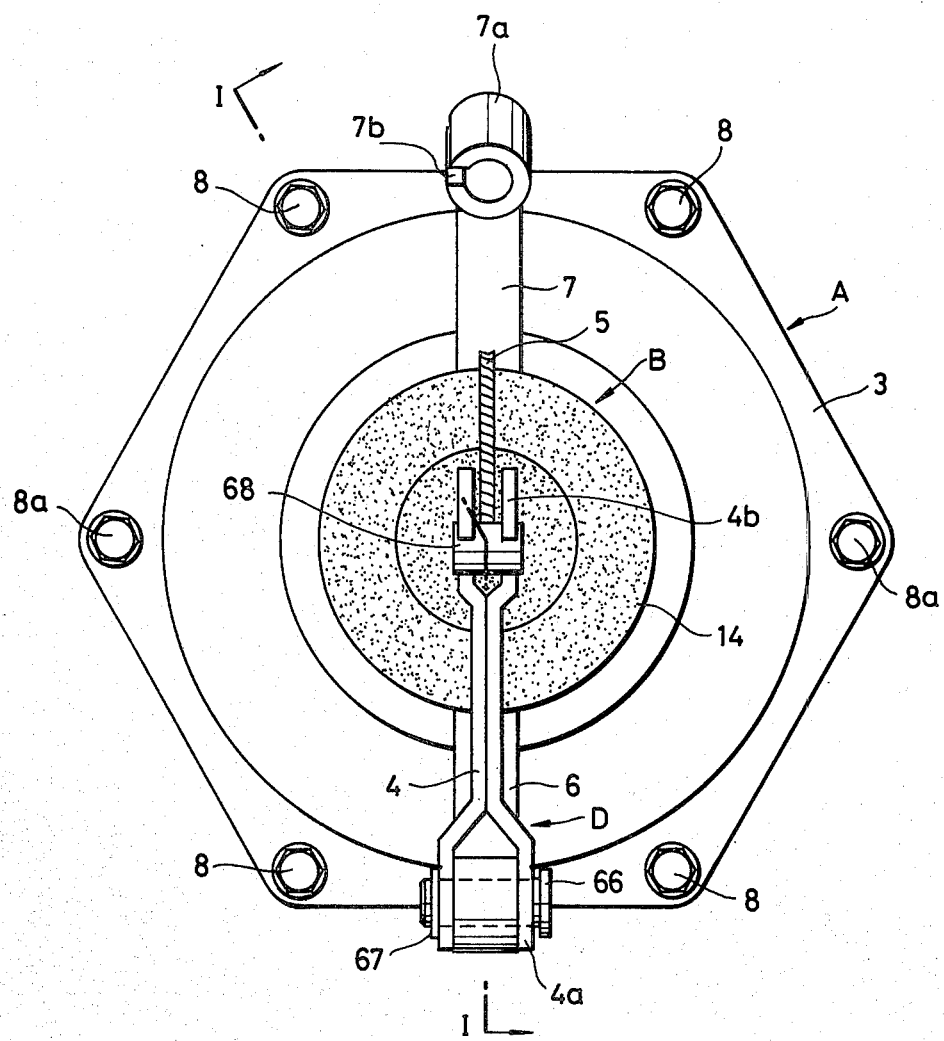

If, for instance, two bolts 8a and 8a, i.e., right and left bolts in FIG. 2, of the clamping bolts are extended, the booster arrangement can be held in place by said two bolts.

The booster arrangement according to the present invention operates in normal state (FIG. 1) as follows:

The booster piston 9 is urged rearwardly under the bias of the booster spring 16 so that the diaphragm 10 of the piston 9 abuts the inner wall of the rear booster shell 3, while the input rod 29 is urged rearwardly under the bias of the return spring 35 so that the rear end of the input rod 29 abuts the point d of application of the operating lever 4. The control valve 38 abuts at its valve head 38c upon the valve seat 36a of the first valve seat body 36 under the bias of the valve spring 40 and, at its sliding portion 36b, comes in close contact with the end 29a of the input rod 29. Accordingly, the negative pressure chamber 11 and the variable pressure chamber 12 are well-balanced with respect to air pressures, so that the booster piston 9 is placed under the control of the booster spring 16.

When the brake lever 70 is gripped so as to apply the brakes of a vehicle, a pull is given to the operating wire 5, so that the operating lever 4 is rotated counterclockwise in FIG. 1, and the input rod 29 is advanced by the point d of application. With advancement of the rod 29, the valve head 38c, urged forwards under the bias of the valve spring 40, is moved forwards until it abuts the second valve seat 37, whereupon communications are interrupted between the chambers 11 and 12. Subsequently, the first valve seat 36a and the sliding portion 36b are spaced away from the valve head 38c and the point 29a of the rod 29 to provide two air passages, so that the air inlet communicates with pressure chamber 12 via the air inlet 15, the annular groove 45, the communication slot 44, the interior of the control valve 38, the aforesaid air passages and the passage 42. Consequently, the variable pressure chamber 12 is always maintained at a pressure higher than that prevailing in the negative pressure chamber 11. A resultant difference in air pressure between both chambers causes advancement of the booster piston 9 against the action of booster spring 16. This further leads to advancement of the working piston 49 of the liquid pressure generator mechanism C through the output rod 24, thus applying the brakes of a vechicle.

As the end 29a of the input rod 29 advances, it receives the reaction from the output rod 24 through the reaction plate 22 and the reaction rubber 23, so that the operator can detect a resultant braking force through the input rod 29, the operating lever 4, the operating wire 5 and the brake lever 70.

Upon removal of a force impressed on the brake pedal 70, retraction of the input rod 29 takes place under the influences of the reaction force and the return spring 35, where by the sliding portion 36b of the first valve seat body 36 abuts closely the end 29a, and the first valve seat 36a abuts the valve head 38c which is now moved away from the second valve seat 37, so that both chambers 11 and 12 are well-balanced with respect to air pressure. The booster piston 9 is retracted by the booster spring 16.

Since, in the present invention, the operating lever is rotated by the operating wire to actuate the input rod, the booster arrangement can be remote-controlled and fixed in any desired place. When the booster arrangement is attached to a handle bar of a two-wheeled vehicle, in particular, a motorcycle, the stability thereof is deteriorated due to the fact that a greater weight is applied on one side of the handle. However, it is feasible to remote-control the booster arrangement attached between the headlight and the center of the handle, to the lower portion of the headlight or to the center of the vehicle. The booster arrangement may also be clamped to part of the vehicle by making use of some of the shell-clamping bolts. In addition, if the point of application of the operating lever for giving a push to the input rod is located between the pivotal point and the point of force thereof, a greater force is applied on the point of application by leverage. A resultant ratio of the point of application to the point of force assures greater increases in the servo output with no need of varying the size of the booster arrangement. Besides, the position of the operating lever for actuating the input rod can be adjusted by an amount of extension of the operating wire, so that the space between the valve head of the control valve and the second valve seat can be adjusted to zero or a smaller valve. Consequently, the lost strokes of the brake pedal or lever can be reduced, thus assuring that an adequate braking force is always supplied to the brake device for safer driving.

The input rod is slidingly and rockingly inserted at its spherical end into the associated hole in the booster piston, and the first valve body is provided, having on one side the sliding portion to abut slidingly the spherical end and on the other side the first valve seat which the valve head of the poppet valve abuts. Even when the constantly negative pressure and variable pressure chambers are maintained at negative pressures, therefore, the first valve seat of the first valve seat body can abut the valve head of the control valve by the valve spring, even if the input rod rocks due to the movement of the operating lever etc. As a result, the input rod rocks along the sliding portion of the first valve seat body by the time the sliding portion abuts the spherical end of the input rod to permit the valve head of the control valve to be received on the second valve seat. This assures that entrance of an air stream into both chambers is prevented, and that a servo condition caused by a lowering of air pressure is avoided. When the input rod is advanced until the valve head of the control valve abuts the second valve seat, the spaces between the valve head and the first valve seat and between the sliding portion and the end of the input rod provide two air inlet passages leading to the variable pressure chamber. Accordingly, smooth introduction of air into that chamber is realised.

The annular passage is formed between the cylindrical member extending from the rear shell and the dust boot, and is put in communication with the interior of said member in an upper position. The dust boot is also attached to the cylindrical member in such a manner that the air inlet formed therein is located in a lower portion. Consequently, an amount of air goes half round the annular groove, so that foreign matters such as sand, dust and water do not reach the valve mechanism.

What is claimed is:

1. A negative pressure type booster arrangement comprising front and rear booster shells, a booster piston disposed therein for reciprocating movement into a constantly negative pressure chamber which is operatively connected to a negative pressure source and a variable pressure chamber which is always put in interchangeable communication with said negative pressure chamber or the air via a control valve mechanism, an input rod which is connected at one end to said booster piston, and is also connected to said control valve mechanism for permitting said booster piston to follow advancement of said input rod due to a difference in air pressure between both said chambers, said one end of said input rod being formed into an enlarged spherical shape so as to abut slidingly and rockingly the inner wall of an axial support slot in said booster piston, said control valve mechanism having a control valve member which, in turn, has a valve head, and a first annular valve seat body having a sliding portion to come in sliding contact with said spherical end and a first valve seat capable of abutting said valve head of said control valve member, so that the rocking movement of said input rod has no adverse influence on said first valve seat which the control valve abuts.

2. A negative pressure type booster arrangement comprising front and rear booster shells, a booster piston disposed therein for reciprocating movement into a constantly negative pressure chamber which is operatively connected to a negative pressure source and a variable pressure chamber which is always put in interchangeable communication with said negative pressure chamber or the air via a control valve mechanism, an input rod which is connected at one end to said booster piston, and is also connected to said control valve mechanism for permitting said booster piston to follow advancement of said input rod due to a difference in air pressure between both said chambers, a cylindrical member extending from said rear booster shell, a dust boot attached to said cylindrical member, an annular passage formed therebetween, a communication slot formed in the upper portion of said cylindrical member for making communications between said passage and the inner periphery of said cylindrical member, and an air inlet formed in said dust boot and put in communication with said annular passage, said dust boot being attached to said cylindrical member in such a manner that said air inlet is located in a lower portion thereof, said air inlet being formed in a projecting tube attached to said dust boot.

3. A negative pressure type booster arrangement as recited in claim 1, further comprising a cylindrical member extending from said rear booster shell, a dust boot attached to said cylindrical member, an annular passage formed therebetween, a communication slot formed in the upper portion of said cylindrical member for making communications between said passage and the inner periphery of said cylindrical member, and an air inlet formed in said dust boot and put in communication with said annular passage, said dust boot being attached to said cylindrical member in such a manner that said air inlet is located in a lower portion thereof, said air inlet being formed in a projecting tube attached to said dust boot.

4. A negative pressure type booster arrangement comprising front and rear booster shells, a booster piston disposed therein for reciprocating movement into a constantly negative pressure chamber which is operatively connected to a negative pressure source and a variable pressure chamber which is always put in interchangeable communication with said negative pressure chamber or the air via a control valve mechanism, an input rod which is connected at one end to said booster piston, and is also connected to said control valve mechanism for permitting said booster piston to follow advancement of said input rod due to a difference in air pressure between both said chambers, an input transmitting lever bearing against the other end of said input rod, a first arm for supporting said input transmitting lever extending from said booster shells and for pivotally supporting one end of said lever, a second arm for supporting an operating wire, which is positioned opposite to said first arm, so that when an operating force is applied on the other end of said input transmitting lever by means of said operating wire, said control valve mechanism is actuated through said input rod, and a booster output is produced by said difference in air pressure between said both chambers, that part of said input transmitting lever that bears against said input rod being positioned between said first and second arms, a cylindrical member extending from said rear booster shell, a dust boot attached to said cylindrical member, an annular passage formed therebetween, a communication slot formed in the upper portion of said cylindrical member for making communications between said passage and the inner periphery of said cylindrical member, and an air inlet formed in said dust boot and put in communication with said annular passage, said dust boot being attached to said cylindrical member in such a manner that said air inlet is located in a lower portion thereof, said air inlet being formed in a projecting tube attached to said dust boot.

5. A negative pressure type booster arrangement comprising front and rear booster shells, a booster piston disposed therein for reciprocating movement into a constantly negative pressure chamber which is operatively connected to a negative pressure source and a variable pressure chamber which is always put in interchangeable communication with said negative pressure chamber or the air via a control valve mechanism, an input rod which is connected at one end to said booster piston, and is also connected to said control valve mechanism for permitting said booster piston to follow advancement of said input rod due to a difference in air pressure between both said chambers, an input transmitting lever bearing against the other end of said input rod, a first arm for supporting said input transmitting level extending from said booster shells and for pivotally supporting one end of said lever, a second arm for supporting an operating wire, the other end of said input transmitting lever being supplied with an operating force by means of said operating wire, and said control valve mechanism being operated through said input rod, an adjusting bolt mounted on a case for said operating wire and inserted into a supporting portion of said second arm, a nut threaded onto said bolt, so that a distance is adjusted between the points of force of said first and second arms, and said input rod is moved forwards or rearwards to adjust a clearance between the valve head of a control valve and a second valve seat of said control valve mechanism, a cylindrical member extending from said rear booster shell, a dust boot attached to said cylindrical member, an annular passage formed therebetween, a communication slot formed in the upper portion of said cylindrical member for making communications between said passage and the inner periphery of said cylindrical member, and an air inlet formed in said dust boot and put in communication with said annular passage, said dust boot being attached to said cylindrical member in such a manner that said air inlet is located in a lower portion thereof, said air inlet being formed in a projecting tube attached to said dust boot.

* * * * *